United States Patent

[11] 3,620,673

[72] Inventor Timothy J. Browder, Jr.
 Los Angeles, Calif.
[21] Appl. No. 715,084
[22] Filed Mar. 21, 1968
[45] Patented Nov. 16, 1971
[73] Assignee The Ralph M. Parsons Company
 Los Angeles, Calif.

[54] METHOD OF PRODUCING SULFURIC ACID
 7 Claims, 3 Drawing Figs.
[52] U.S. Cl. ................................................ 23/168,
 23/176
[51] Int. Cl. ........................................... C01b 17/76
[50] Field of Search .......................................... 23/168,
 167, 175, 176

[56] References Cited
 UNITED STATES PATENTS
3,443,896 5/1969 Furkert et al. .................. 23/168
3,350,169 10/1967 Rinckhoff ..................... 23/168
 FOREIGN PATENTS
1,058,261 2/1967 England ........................ 23/168

Primary Examiner—Oscar R. Vertiz
Assistant Examiner—Charles B. Rodman
Attorney—Christie, Parker & Hale ABSTRACT: Hot combustion gases bearing sulfur dioxide produced by burning sulfur in air are cooled in a waste heat boiler and a heat exchanger before introduction into a multipass catalytic converter. The majority of the sulfur dioxide is converted to sulfur trioxide in the converter in the presence of a catalyst. Intermediate and final absorption stages remove the sulfur trioxide. The stream leaving the waste heat boiler is cooled in the heat exchanger to the required initial conversion temperature by indirect heat transfer with a return gas stream from the intermediate absorption stage. In addition, the return gas stream from the intermediate absorption stage cools the primary catalysis reaction gas stream between conversion passes. After the last conversion pass of the primary catalysis and before intermediate absorption, the primary catalysis reaction stream is cooled in an economizer, boiler or the like. The return gas stream from the intermediate absorption stage after being heated in heat exchangers undergoes further catalytic conversion in the converter and then additional absorption takes place.

METHOD OF PRODUCING SULFURIC ACID

BACKGROUND OF THE INVENTION

This invention relates to the art of sulfuric acid production. In particular, the invention relates to an improved process for converting sulfur dioxide, produced by the combustion of elemental sulfur in air, by multiple-pass catalysis into sulfur trioxide and ultimately to sulfuric acid.

One method for producing sulfuric acid begins by burning molten sulfur in dry air to form sulfur dioxide ($S+O_2=SO_2$) which, after being properly cooled, is catalytically converted to sulfur trioxide. A considerable amount of heat is generated by this combustion. The hot combustion products are forced through a waste heat boiler which generates high-pressure steam and cools the sulfur dioxide gas to the required temperature for catalytic conversion. If desired, the steam generated in the boiler may be used elsewhere in the plant to operate equipment. Catalytic conversion of the cooled sulfur dioxide gas takes place in a multistage converter in the presence of a suitable catalyst such as vanadium pentoxide. This reaction is exothermic and therefore liberates a considerable amount of heat with a majority of the heat being released in the first conversion stage. The catalytic reaction also tends to reverse when the reaction temperature becomes excessive. Therefore, the first-stage catalysis stream is cooled and reintroduced into the converter for further catalytic conversion. The next stage of conversion occurs before any absorption stage and produces another increase in temperature of the reaction stream and a low oxygen to sulfur dioxide ratio. This low oxygen to sulfur dioxide ratio decreases the catalysis reaction. The stream is therefore normally cooled in heat exchangers or diluted or quenched by the addition of dry air or gas.

The sulfur trioxide produced in the converter is cooled and then introduced into an absorber system. In the absorber system the sulfur trioxide is absorbed by a countercurrent flow of strong sulfuric acid. After removal of the sulfur trioxide, the stream eventually is exited as stack gas.

This process begins with sulfur dioxide at a temperature in excess of the beginning conversion temperature. Some processes begin with a sulfur dioxide stream at a temperature lower than the beginning conversion temperature. OF these, one of the most common begins by roasting iron pyrites or other sulfur-bearing materials with air to produce sulfur dioxide, which is cooled, purified, and dried before being preheated for the catalysis reaction.

One roasting process also employs multipass or multistage catalytic conversion with heat exchange between each stage to cool the catalysis reaction stream. This process employs an intermediate absorption stage to remove sulfur trioxide from the catalysis reaction stream before catalytic conversion is completed. The absorber exit gas, containing sulfur dioxide, is returned to the converter. The intermediate absorber exit gas is at a relatively low temperature. The low temperature intermediate absorber exit gas is used to cool the hot catalysis reaction stream before it enters the intermediate absorber. The heat energy produced during conversion is used to heat the first-stage converter inlet gas to its beginning conversion temperature. The heat exchange with the first-stage converter inlet gas cools the catalysis reaction stream between stages. This process is reputed to produce about 99.5 percent conversion of sulfur dioxide into sulfur trioxide and is described in U.S. Pat. No. 3,142,536 to Guth et al.

The present commercial practice of conversion of sulfur dioxide to sulfur trioxide and then to sulfuric acid, using multiple pass catalysis and only one stage of absorption, results in stack effluents containing 2 percent to 4 percent of the initial sulfur dioxide of the catalysis feed as pollutants. Recent developments in antipollution legislation are imposing stringent requirements to avoid the discharge of sulfur dioxide to the atmosphere which require even less sulfur dioxide in the stack gas.

Therefore, there is a present need to effect maximum conversion of sulfur dioxide to sulfur trioxide in sulfuric acid production plants in an economical manner.

SUMMARY OF THE INVENTION

The present invention provides a process for producing sulfuric acid from sulfur dioxide formed by burning sulfur in air. The sulfur dioxide is converted to sulfur trioxide by catalytic oxidation in a multiple-pass catalytic converter. The process employs a cool return gas stream leaving an intermediate sulfur trioxide absorber or extractor to cool a converter inlet stream emanating from the sulfur combustion furnace to a beginning conversion temperature before the inlet stream enters the converter; and the cool return gas stream also cools the primary catalysis reaction stream between successive passes of catalytic conversion.

In a more specific form, the present invention employs the use of at least two stages of catalytic oxidation with a plurality of passes in at least the first stage to convert the sulfur dioxide in a converter inlet stream from a sulfur combustion furnace and boiler into sulfur trioxide. An intermediate sulfur trioxide absorption stage removes the sulfur trioxide formed in the first stage of catalytic conversion. The sulfur dioxide in a return gas stream from the intermediate absorption stage ultimately undergoes a second stage of catalytic conversion. The return gas stream from the intermediate absorber is at a low temperature. This stream passed in heat exchange relationship with the converter inlet stream coming from the sulfur combustion furnace and boiler to cool the stream to a beginning conversion temperature. The return gas stream is also used in the cooling of the primary catalysis reaction stream between successive first-stage passes through the converter which is upstream from the absorption stage. The cooling between successive conversion passes lowers the temperature of the primary catalysis reaction stream to approximately the beginning conversion temperature before a pass is made. After the last conversion pass of the primary catalysis reaction stream and before the intermediate sulfur trioxide absorption stage, the primary catalysis reaction exit stream is cooled to a beginning absorption temperature by heat exchange with, for example, water used in a waste heat boiler or an economizer. After the intermediate sulfur trioxide absorption stage, the return gas stream, still containing sulfur dioxide and oxygen, is heated by the converter inlet stream and the primary catalysis reaction stream to approximately the beginning conversion temperature to form a secondary catalysis reaction stream. The heated secondary catalysis reaction stream passes into the catalytic converter for the second stage of catalytic conversion.

The use of the return gas stream emanating from the intermediate sulfur trioxide absorption stage to cool the converter inlet stream from the sulfur combustion furnace and boiler and to cool the primary catalysis reaction stream between conversion passes may be accomplished in a number of ways. The return gas stream may be split with a first branch cooling the converter inlet stream from the combustion furnace and boiler and with a second branch cooling the primary catalysis reaction stream between successive conversion passes. Alternately, the return gas stream may be passed initially into heat exchange relationship with the primary catalysis reaction stream between conversion passes and then passed into heat exchange relationship with the converter inlet stream. It is also possible to employ the return gas stream to initially cool the converter inlet stream and then to cool the primary catalysis reaction stream between successive passes through the catalytic converter.

In all cases, after the return gas stream from the intermediate absorber has preformed its cooling function, it becomes the secondary catalysis reaction stream. The contained sulfur dioxide of the secondary catalysis reaction stream is catalytically converted in the second stage of the converter for the purpose of extracting further sulfur trioxide. Therefore, the return gas stream is heated to a beginning conversion temperature prior to the catalytic conversion of its sulfur dioxide. After the second stage of catalytic conversion, the secondary catalysis reaction stream is cooled and passed into a second stage of sulfur trioxide absorption for the removal of the sulfur trioxide formed. Sulfur trioxide is extracted by two states of absorption in sulfuric acid. Absorption may be effected in absorption towers where sulfur trioxide gas is absorbed in a countercurrent flow of sulfuric acid to produce a higher strength acid. The intermediate absorption stage produces sulfuric acid with dissolved sulfur dioxide from the primary catalysis reaction stream. This dissolved sulfur dioxide may be stripped with air from the sulfuric acid in a drying tower or special stripping tower and returned to the combustion furnace and the converter inlet stream. This increases the amount of product acid and reduces the amount of sulfur dioxide in the stack gases; this also reduces the dissolved content of sulfur dioxide in the product acid.

The cooling of the secondary catalysis reaction stream after it leaves the converter is accomplished by passing the stream in heat exchange relationship with a fluid which must be heated. Boilers, economizers, superheaters and gas coolers are used in sulfuric acid production plants and may be used to cool the secondary catalysis reaction stream. The heat contained in the converted secondary catalysis reaction stream can be used to heat purified water which may be passed into a waste heat boiler where it is used to cool the sulfur dioxide bearing stream leaving the sulfur combustion furnace. The same cooling media may be used to cool the primary catalysis reaction stream just prior to the intermediate sulfur trioxide absorption stage.

The process of the present invention offers enhanced sulfuric acid plant economies. The process reduces the cost in terms of capital expenditure, maintenance and upkeep of the heat exchangers required in the conversion of sulfur dioxide to sulfur trioxide. After the intermediate sulfur trioxide absorption stage, the return gas stream is at a relatively low temperature and has not suffered a great loss in its mass flow rate. This low temperature in conjunction with the high temperature of the converter inlet stream reduces the heat exchange surface necessary to lower the converter inlet stream to the required temperature of conversion and to raise the return gas stream to a beginning conversion temperature. Moreover, the temperature differential and mass flow rates are such that the return gas stream may also be used in cooling the primary catalysis reaction stream between successive passes through the converter. These economies are effected while reducing the amount of sulfur dioxide discharged to atmosphere, thereby reducing pollution problems. Very high conversion is possible because of the intermediate sulfur trioxide absorption stage and further by recycling sulfur dioxide dissolved in the sulfuric acid associated with the intermediate stage absorber.

These and other features, aspects and advantages of the present invention will become more apparent from the following description, appended claims, example and drawings.

DESCRIPTION OF THE PREFERRED EMBODIMENTS

Figure 1:
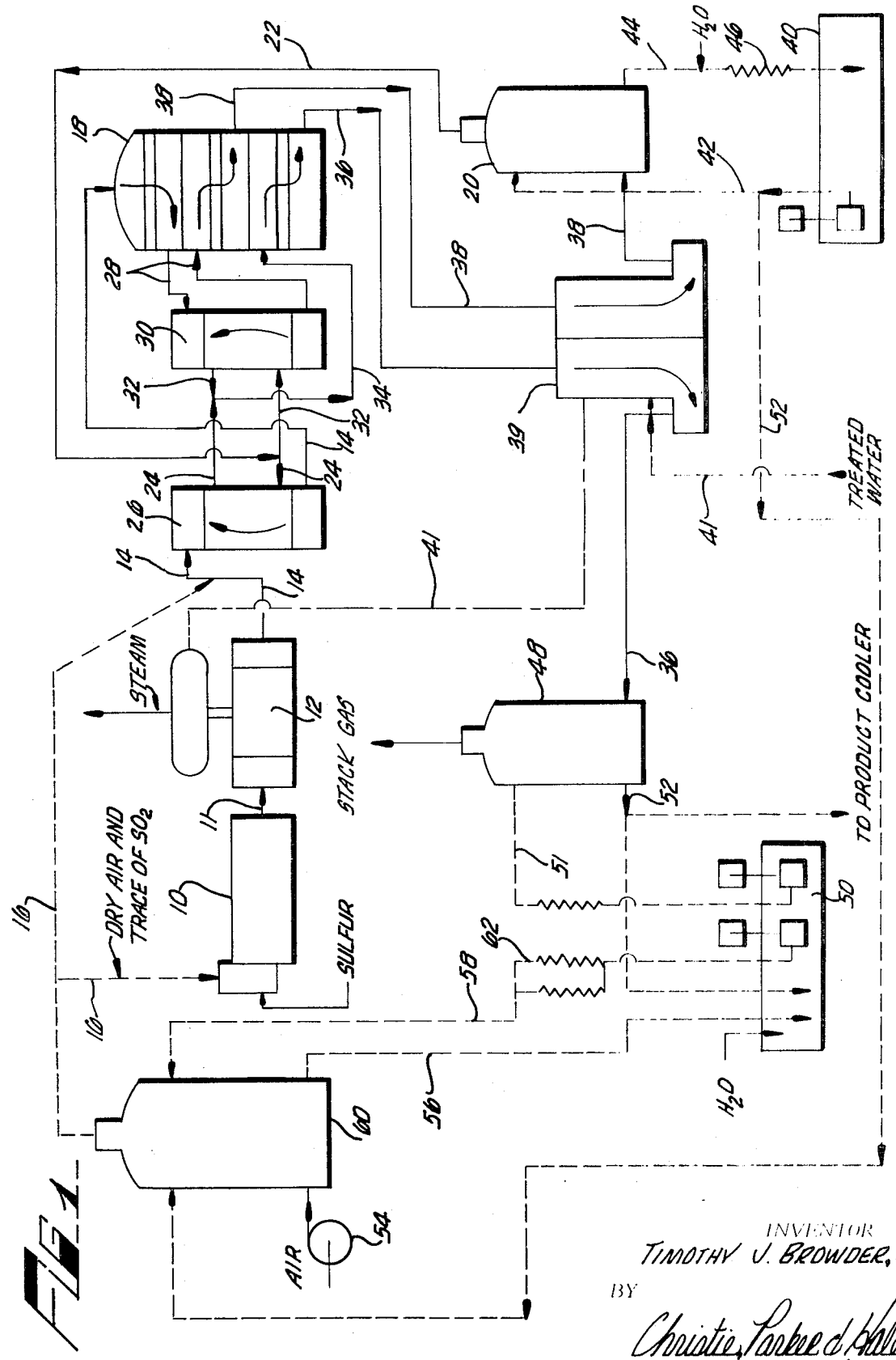
FIG. 1 is a flowsheet depicting one form of the process of the present invention.

FIG. 1 is a flowsheet of a sulfuric acid production plant. The plant burns sulfur in air to form sulfur dioxide which is converted into sulfur trioxide. The sulfur trioxide gas produced is absorbed to produce sulfuric acid.

Elemental sulfur is burned in a combustion furnace 10 with previously dried air to produce sulfur dioxide. A high-temperature stream 11 containing this sulfur dioxide leaves furnace 10 and is introduced into a waste heat boiler 12. Stream 11 is cooled in the waste heat boiler but leaves at a temperature higher than required for the converter inlet. The stream leaving boiler 12 may merge with a bypass stream of sulfur dioxide and air to form a converter inlet stream 14. The bypass stream is denominated by reference number 16.

Converter inlet stream 14 contains the sulfur dioxide which will be converted to sulfur trioxide. The sulfur dioxide is converted to sulfur trioxide by a catalysis process. The resulting sulfur trioxide becomes sulfuric acid by absorption in sulfuric acid and subsequent dilution with water.

Catalytic conversion is accomplished in a two-stage, multipass converter 18. An intermediate absorption or extraction stage is accomplished in an absorber 20. The intermediate absorption stage separates the conversion stages into primary and secondary stages. A return gas stream 22 containing some sulfur dioxide and oxygen leaves absorber 20. Stream 22 contains the sulfur dioxide which remains after the primary stage of catalytic conversion in converter 18. This stream leaves absorber 20 at a much lower temperature than the beginning conversion temperature. Stream 14 is passed in indirect heat exchange relationship with a branch of return gas stream 22, denoted by reference numeral 24, in a heat exchanger 26. Stream 14 is reduced in temperature in this heat exchanger to a beginning conversion temperature of about 800° F. After it reaches a beginning conversion temperature, stream 14 passes into converter 18 for the primary stage of catalytic conversion.

The sulfur dioxide contained in converter inlet stream 14 undergoes a primary stage or step of catalytic conversion in converter 18. A primary catalysis reaction stream 28 containing sulfur dioxide and sulfur trioxide is produced in this primary conversion stage or step. The primary catalysis reaction stream passes from the converter for cooling in heat exchanger 30. The cooling of stream 28 to a suitable beginning conversion temperature prior to the second pass through converter 18 is necessary to effect a maximum amount of sulfur dioxide conversion by preventing reversal of the conversion reaction.

The second branch of return gas stream 22, stream 32, is used as the heat exchange medium for cooling primary catalysis reaction stream 28. Stream 32 is, therefore, passed in indirect heat exchange relationship with stream 28 in heat exchanger 30 where the latter's temperature is lowered to a beginning conversion temperature. After leaving heat exchanger 30, stream 32 merges with stream 24 coming from heat exchanger 26. The two streams, 24 and 32, form stream 34 when they leave heat exchangers 26 and 30. Stream 34 is at a beginning conversion temperature.

The merged stream, indicated by reference numeral 34, becomes the secondary catalysis reaction stream. The secondary catalysis reaction stream passes into converter 18 for the second or final stage of catalytic conversion of its contained sulfur dioxide into sulfur trioxide. After this last stage of conversion, the secondary catalysis reaction stream leaves the converter at an elevated temperature as a stream 36.

Primary catalysis reaction stream 28, after its cooling in heat exchanger 30, is reintroduced into converter 18 for a second or more passes of catalytic conversion in the primary stage of the converter. After the second or several passes through the converter the primary catalysis reaction stream, containing significant amounts of sulfur trioxide, leaves the converter as a stream 38. Stream 38 is slightly hotter than stream 36 but both streams are cooled for subsequent processing.

Stream 38 is cooled in a boiler, economizer or superheater 39 to a beginning extraction temperature for introduction into absorber 20. The heat exchange medium for this cooling is a treated water or steam stream 41. The sulfur trioxide contained in stream 38 is absorbed by sulfuric acid circulating from a pump tank 40 through a line 42. The resulting higher concentrate sulfuric acid leaves absorber 20 as an acid stream 44 and is cooled in a heat exchanger 46 before entrance into pump tank 40. The return stronger sulfuric acid stream is then diluted to the strength of the acid in tank 40 by the addition of water as indicated. Return gas stream 22 leaving absorber 20, therefore, has had a considerable amount of sulfur trioxide removed from it before its continued processing in converter 18. The last stage of conversion results in stream 36 as previously described.

Stream 36 leaves converter 18 and passes for cooling into boiler, superheater or economizer 39 to reduce its temperature for a second stage of absorption in an absorber 48. Again the cooling medium is steam or water stream 41. A main pump tank 50 contains sulfuric acid which is circulated through absorber 48 from line 51 for the absorption of the final sulfur trioxide in stream 36. The sulfur trioxide taken from stream 36 leaves absorber 48 from line 51 for the absorption of the final sulfur trioxide in stream 36. The sulfur trioxide taken from stream 36 leaves absorber 48 as a stream of relatively concentrated sulfuric acid 52 for reintroduction into main pump tank 50 or for diversion to a product cooler. The concentration of the acid in tank 50 may be maintained by the addition of water as indicated.

Pump tank 40 contains sulfuric acid and a considerable amount of dissolved sulfur dioxide gas. This sulfur dioxide is stripped in a drying tower 60 and enters stream 16. For this purpose, the sulfuric acid and dissolved sulfur dioxide are removed from pump tank 40 as a stream 52 and introduced into the top of drying tower 60. Air is also introduced into drying tower by a blower 54. The sulfuric acid stripped of its dissolved sulfur leaves drying tower 60 as a stream 56 and passes into main pump tank 50. The sulfuric acid also dries the combustion air in stream 16 which is used in furnace 10. Sulfuric acid is taken from main pump tank 50 as a stream 58 and introduced into drying tower 60 to augment the stripping and air-drying process. Stream 58 is cooled in heat exchanger 62 prior to its introduction into drying tower 60.

Figure 2:
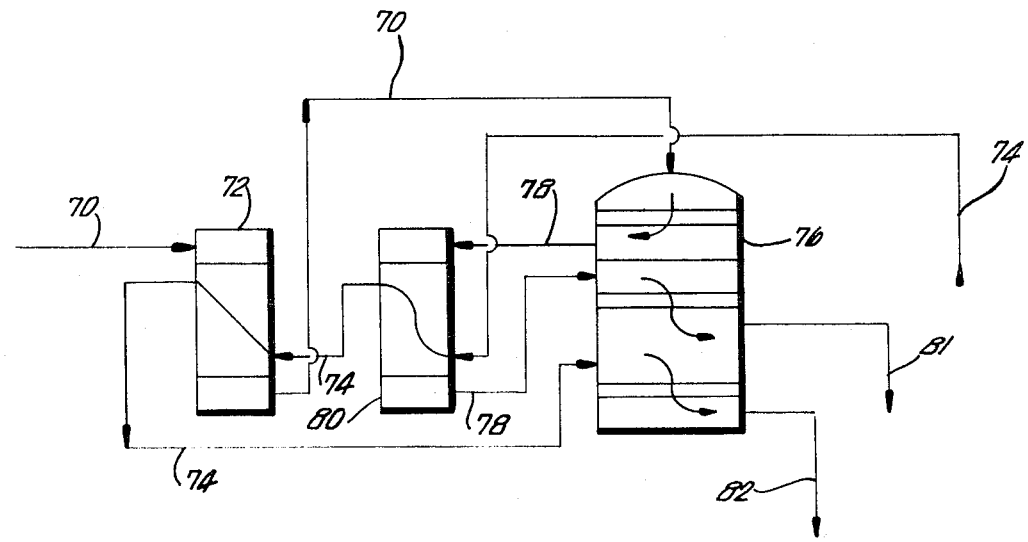
FIG. 2 is another flowsheet depicting an alternate form of the process shown in FIG. 1.

FIG. 2 depicts an alternate method of cooling a converter inlet stream to a beginning, optimum conversion temperature and for cooling the primary catalysis reaction stream between successive passes in the primary converter stage.

A converter inlet stream 70 from a sulfur combustion furnace (not shown) passes through a heat exchanger 72 where it is lowered in temperature to a beginning, optimum conversion temperature. Cooling is effected in heat exchange 72 by heat exchange with a return gas stream 74 coming from an intermediate absorber (not shown). At the beginning conversion temperature, converter inlet stream 70 enters a catalytic converter 76 where a pass through a first-stage bed converts some of the sulfur dioxide to sulfur trioxide. The primary catalysis reaction stream, denominated by reference numeral 78, leaves converter 76 at an elevated temperature and passes into a heat exchanger 80. In heat exchanger 80, stream 78 is cooled to a beginning conversion temperature by heat exchange with return gas stream 74. After leaving heat exchanger 80, stream 78 enters converter 76 for a second catalytic conversion pass. After this pass, the primary catalysis reaction stream, shown by reference numeral 81, undergoes cooling and an intermediate stage of absorption of its sulfur trioxide to form a return gas stream 74. This cooling and absorption takes place in a manner identical to that described with reference to FIG. 1.

After being heated in heat exchanger 72 and 80 to a beginning, optimum conversion temperature, return gas steam 74 passes into catalytic converter 76 for the last stage of conversion. A fully converted stream 82 leaves converter 76 for cooling and the final stage of absorption in the manner previously described.

Figure 3:
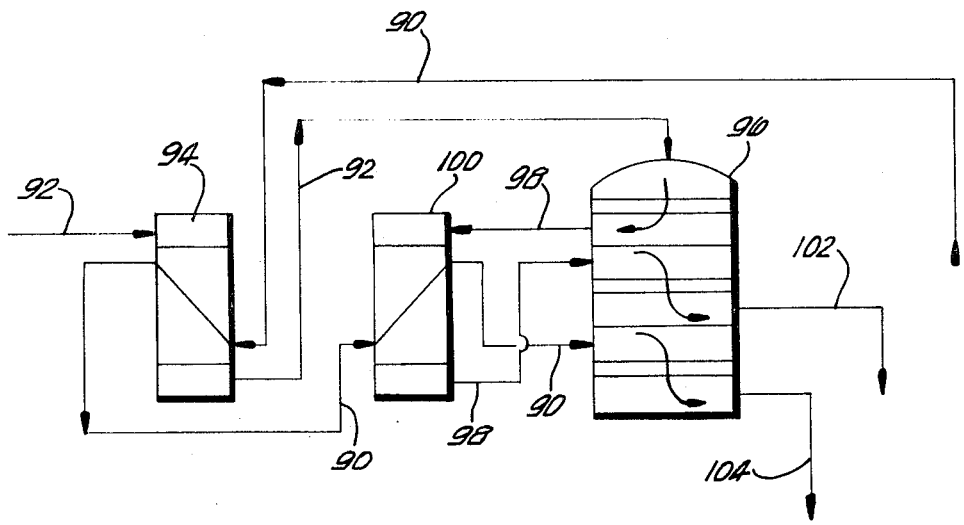
FIG. 3 is a flowsheet showing still a further modification of the process of the present invention.

FIG. 3 illustrates another embodiment of the present invention wherein the sequence of cooling by the return gas stream is reversed over that described with reference to FIG. 2.

As previously, a return gas stream 90 from an intermediate absorber (not shown) and at a relatively low temperature passes in indirect heat exchange relationship with a stream 92 from a sulfur combustion furnace (not shown). This heat exchange is accomplished in a heat exchanger 94 and is the first heat exchange for stream 90. The temperature of converter inlet stream 92 leaving heat exchanger 94 is within a range of temperatures suitable for the initiation of catalytic conversion. The converter inlet stream enters a converter 96 where a first-stage sulfur dioxide to sulfur trioxide conversion takes place by catalytic oxidation. After the first pass of the first-stage conversion, the primary catalysis reaction stream, denominated by reference numeral 98, leaves the converter and passes into heat exchanger 100. In heat exchanger 100, primary catalysis reaction stream 98 passes in indirect heat exchange relationship with return gas stream 90 and is cooled to a beginning conversion temperature. Stream 98 is then reintroduced into converter 96 for a second or more passes through the beds of the converter. After the second pass of the first stage of catalytic conversion the primary catalysis reaction stream leaves converter 96 as a stream 102. Stream 102 is cooled and its entrained sulfur trioxide extracted to form return gas stream 90 as in the embodiment described with reference to FIG. 1.

Stream 90 leaves heat exchanger 100 as a secondary catalysis reaction stream at a beginning, optimum conversion temperature and passes into converter 96 for the last stage of conversion. After this last stage of conversion, a resultant stream 104 leaves converter 96 for subsequent cooling and sulfur trioxide extraction as in the previously described embodiments.

The following example illustrates specifically the various parameters experienced in the process of the present invention. The example is with reference to FIG. 1.

EXAMPLE

Sulfur is burned with air dried in drying tower 60 in combustion furnace 10. Sulfur dioxide stripped in drying tower 60 from the sulfuric acid introduced from tank 40 is also introduced into the furnace. A portion of the dried air and this stripped sulfur dioxide from the tower is bypassed into converter inlet stream 14 downstream from boiler 12. The conversion of the molten sulfur to sulfur dioxide takes place at a reaction temperature of approximately 1,750° F. The sulfur dioxide leaves the furnace at this temperature in stream 11. Stream 11, containing approximately 11 percent sulfur dioxide, passes into waste heat boiler 12 where its temperature is reduced. Stream 11 then combines with bypass stream 16 of air and sulfur dioxide to form converter inlet stream 14; this combined stream enters heat exchanger 26 at about 1,080° F. and contains approximately 10 percent sulfur dioxide and 11 percent oxygen.

Stream 14 then passes through heat exchanger 26 where its temperature is reduced to a converter inlet temperature of about 800° F. Branch 24 of return gas stream 22 is heated from about 180° F. to a beginning conversion temperature of about 830° F. The return gas stream contains about 1 percent sulfur dioxide.

Branch 32 of return gas stream 22 is heated in heat exchanger 30 from about 18° to about 830° F. Branch 32 is then combined with heated stream 24 to form stream 34 which is introduced into converter 18 where the final stage of conversion occurs and converter exit stream 36 formed. Stream 36 leaves converter 18 at a temperature in excess of about 850° F. The downstream processing of stream 36 will be described subsequently.

During the first pass in the primary converter stage, primary catalysis reaction stream 28 is formed. This stream leaves converter 18 at a temperature of about 1,140° F. and is cooled by branch 32 of return gas stream 22 to a beginning conversion temperature of about 810° F. After two or more passes through the beds of converter 18, stream 38 is formed which leaves the converter at a temperature of about 937° F. Stream 38 has about nine parts sulfur trioxide to about one part of sulfur dioxide; the sulfur dioxide is then about 90 percent converted to sulfur trioxide.

Stream 38 is cooled in economizer 39 to a temperature of about 450° F. At this temperature, stream 38 is introduced into intermediate absorber 20 where stream 22 is formed. As was previously stated, stream 22 is at a temperature of about 180° F. and contains about 1 percent sulfur dioxide.

Absorption in absorber 20 is accomplished with recycled sulfuric acid from tank 40. The temperature of the contents of the tank is about 180° F. The temperature of return acid stream 44, before cooling in heat exchanger 46 and dilution by water, is about 240°

Gas stream 36 leaves converter 18 and passes through economizer 39 where it is cooled to about 450° F. by boiler feed water steam stream 41.

After the final stage of absorption in absorber 48, the remaining sulfur dioxide is vented to atmosphere. This stream contains about 0.05 parts sulfur dioxide by volume.

The sulfur dioxide dissolved in the sulfuric acid used to absorb the sulfur trioxide in absorber 20 is stripped in tower 16 and recycled in gas stream 16, which is predominantly air, for conversion to sulfur trioxide.

To summarize, beginning with a gas stream 14 containing about 10 parts sulfur dioxide through the multiple catalysis and multiple absorption process described, results in but 0.05 parts sulfur dioxide leaving absorber 48. This represents in excess of 99.5 percent conversion of sulfur dioxide to sulfur trioxide and, ultimately, to sulfuric acid.

If desired, known methods may be employed to convert the sulfur trioxide in stream 38 to either fuming sulfuric acid (oleum) or liquid sulfur trioxide.

The present invention has been described with reference to certain preferred embodiments. It should be understood by those skilled in the art that the foregoing description should not limit the spirit and scope of the appended claims.

What is claimed is:

1. In a process for the production of sulfuric acid wherein the sulfur dioxide in a sulfur dioxide converter inlet stream obtained by sulfur combustion is converted to sulfur trioxide by a plurality of passes through the catalytic beds of a first catalytic oxidation stage followed by intermediate extraction of sulfur trioxide and wherein the intermediate extraction of the formed sulfur trioxide produces a relatively cool return gas stream containing unconverted sulfur dioxide for passage to a second catalytic oxidation stage, the improvement which comprises:
   a. cooling the converter inlet stream to a beginning catalytic conversion temperature by indirect heat exchange with at least a portion of the return gas stream;
   b. introducing the converter inlet stream to a first catalytic bed of the first catalytic oxidation stage to form a primary catalysis reaction stream;
   c. cooling the primary catalysis reaction stream to beginning conversion temperature before passage to each additional catalytic bed of the first catalytic oxidation stage by indirect heat exchange at least a portion of the return gas stream;
   d. passing the primary catalysis reaction stream from the final bed of first oxidation stage to the intermediate extractor stage without heat exchange with the return gas stream to maximize conversion of sulfur dioxide to sulfur trioxide prior to intermediate extraction;
   e. heating the return gas stream to a beginning catalytic conversion temperature by the cumulative heating effects of indirect heat exchange with:
      i. the converter inlet stream, and
      ii. the primary catalysis reaction stream between each pass through a bed of the first catalytic oxidation stage,
   to minimize the temperature differentials required for indirect heat exchange;
   f. passing the heated return gas stream to a second catalytic oxidation stage.

2. The improvement claimed in claim 8 including the additional step of cooling the catalysis reaction stream after the last catalytic conversion step before the intermediate extraction stage to a beginning extraction temperature by indirect heat exchange with a cooler media used in the production of the sulfuric acid.

3. The improvement claimed in claim 2 wherein:
   a. the return gas stream is split into a first and a second cooling stream;
   b. the first cooling stream cooling the converter inlet stream; and
   c. the second cooling stream cooling the primary catalysis reaction stream before passage to each additional catalytic bed of the first catalytic oxidation stage.

4. The improvement claimed in claim 2 wherein the return gas stream passes successively into heat exchange relationship with:
   a. the primary catalysis reaction stream before passage to each additional catalytic bed of the first catalytic oxidation stage; and
   b. the converter inlet stream.

5. The improvement claimed in claim 2 wherein the return gas stream passes successively into heat exchange relationship with:
   a. The converter inlet stream; and
   b. the catalysis reaction stream before passage to each additional catalytic bed of the first catalytic oxidation stage.

6. The improvement claimed in claim 2 wherein:
   a. the sulfur trioxide extracted in the intermediate extraction stage is extracted by absorption in sulfuric acid in an absorber; and
   b. the sulfur dioxide absorbed with the sulfur trioxide is stripped from the sulfuric acid used in the absorber and recycled into the converter inlet stream.

7. In a process for the production of sulfuric acid wherein the sulfur dioxide in a sulfur dioxide converter inlet stream obtained by the sulfur combustion is converted to sulfur trioxide by a plurality of passes through the catalytic beds of a first catalytic oxidation stage followed by intermediate extraction of sulfur trioxide and wherein the intermediate extraction of the formed sulfur trioxide produces a relatively cool return gas stream containing unconverted sulfur dioxide for passage to a second catalytic oxidation stage, the improvement which comprises:
   a. cooling the converter inlet stream to a beginning catalytic conversion temperature by indirect heat exchange with at least a portion of the return gas stream;
   b. introducing the converter inlet stream to a first catalytic bed of the first catalytic oxidation stage to form a primary catalysis reaction stream;
   c. cooling the primary catalysis reaction stream to a beginning conversion temperature before passage to an additional bed of the first catalytic oxidation stage by indirect heat exchange with at least a portion of the return gas stream;
   d. passing the primary catalysis reaction stream from the final bed of the first catalytic oxidation stage to the intermediate extraction stage without heat exchange with the return gas stream to maximize conversion of sulfur dioxide to sulfur trioxide prior to intermediate extraction;
   e. heating the return gas stream to a beginning catalytic conversion temperature by the cumulative heating effects of indirect heat exchange with:
      i. the converter inlet stream,
      ii. the primary catalysis reaction stream, to minimize the temperature differentials required for indirect heat exchange,
   f. passing the heated return gas stream to a second catalytic oxidation stage.

* * * * *

PO-1050
(5/69)

UNITED STATES PATENT OFFICE
CERTIFICATE OF CORRECTION

Patent No. __3,620,673__                Dated __Nov. 16, 1971__

Inventor(s) __Timothy J. Browder, Jr.__

It is certified that error appears in the above-identified patent and that said Letters Patent are hereby corrected as shown below:

Column 1, line 44:   "OF" should be --Of--.

Column 3, line 6:    "states" should be --stages--.

Column 4, line 5:    "number" should be --numeral--.

Col. 5, line 14:  The following was duplicated and should be omitted:

"from line 51 for the absorption of the final sulfur trioxide in stream 36. The sulfur trioxide taken from stream 36 leaves absorber 48".

Col. 5, line 29:  the word --dioxide-- should be inserted following "sulfur".

Column 5, line 63:   "steam" should be --stream--.

Column 6, line 58:   "18°" should be --180°F--.

Column 7, line 10:   "240°" should be --240°F --.

Col. 8, line 1:      "8" should be --1--.

Signed and sealed this 2nd day of January 1973.

(SEAL)
Attest:

EDWARD M. FLETCHER, JR.
Attesting Officer

ROBERT GOTTSCHALK
Commissioner of Patents